UNITED STATES PATENT OFFICE.

THE NUTRIO MANUFACTURING COMPANY, OF PHILADELPHIA, PENNSYLVANIA, ASSIGNEE, BY MESNE ASSIGNMENTS, OF R. BERKELEY FITTS.

IMPROVEMENT IN PREPARING WHEAT, CORN, AND OTHER GRAINS FOR FOOD.

Specification forming part of Letters Patent No. 117,165, dated July 18, 1871; reissue No. 5,655, dated November 11, 1873; application filed September 18, 1873.

*To all whom it may concern:*

Be it known that R. BERKELEY FITTS, of the city and county of Philadelphia and State of Pennsylvania, invented a new and useful Improvement in Preparing Wheat, Corn, and other Grain for Food; and the following is hereby declared to be a full, clear, and exact description of the same.

This invention has for its object to treat wheat, corn, and other grain with a view to destroying and removing impurities contained therein, and also to cook the glutinous and starchy portions, and to render the grain friable, in order that it may be reduced to any degree of fineness without parting with its phosphates, and so that all its properties shall be brought into condition for easy digestion, and ready and more perfect assimilation by the functions of the human system.

To the accomplishment of these results, the invention consists, first, in subjecting the grain to the action of very hot or boiling water for the purpose of cleaning and purifying it, and for the additional purpose of thoroughly cooking it. The invention consists, secondly, in submitting the grain thus treated to a drying heat, and continuing the same until the grain is in a suitable condition for the mill, or to put up in packages for the market.

In carrying out this invention, the grain, contained in a wire-cloth or perforated vessel of any proper kind, is immersed in hot or boiling water from five to fifteen minutes, according to its condition, being agitated from time to time, so that all the berries or kernels shall be acted upon. Five minutes' time, if the water is at or near the boiling-point, will be sufficient to remove musty odor and other impurities. In order to cook the grain, twenty or even thirty minutes' time may not be too long with the water boiling briskly.

The subsequent drying may be effected by the direct application of steam, or by any suitable means, to bring the grain to a thoroughly-desiccated or crisp condition and well fitted for the mill and market.

Wheat and corn thus treated may be made into grits, or cracked, and prepared for the table in the ordinary manner, only requiring much less time in cooking; or it may be ground into meal or fine flour for many uses. In any form they possess great superiority as food for the human system, and constitute a palatable and economical diet. The product of this treatment is put into sacks or any other packages for the mill or market. The cracked grain, and that ground into meal or fine flour, is put up in suitable packages for the convenience of consumers and dealers.

Among the many advantages resulting from this invention are, the purification and sweetening of the grain, its preservation during the summer and in warm climates, especially while being transported from place to place, and the restoration of its original sound condition after being injured by dampness in transportation or storage.

Having thus described this invention, what is claimed is—

1. The process of purifying and cleaning grain by hot or boiling water, substantially as described, for the purpose specified.

2. The process of purifying and cooking grain by hot or boiling water, substantially as described, for the purpose specified.

3. The process of purifying and cooking grain by hot or boiling water, followed by dry heat, substantially as described, for the purpose specified.

4. As a new commercial article, grain treated by hot water alone, or first by hot water, and afterward by dry heat, substantially as described, for the purpose specified.

TITUS S. EMERY,
*President of the Nutrio Manufacturing Company.*

Witnesses:
E. C. MANN, Jr.,
C. ABBOTT RUGGLES.